United States Patent [19]

Benson et al.

[11] 4,295,918

[45] Oct. 20, 1981

[54] APPARATUS FOR ASSEMBLING A PLASTIC MINING SCREEN

[75] Inventors: Henry E. Benson, Long Lake; Terrence D. Moravec, Minneapolis, both of Minn.

[73] Assignee: UOP Inc., Des Plaines, Ill.

[21] Appl. No.: 107,488

[22] Filed: Dec. 26, 1979

[51] Int. Cl.[3] .......................... B07B 1/46; B32B 1/00
[52] U.S. Cl. .......................... 156/434; 29/163.5 CW; 156/296; 156/309.9; 156/322; 156/499; 209/401; 428/295
[58] Field of Search ............ 29/33 F, 779, 163.5 CW; 156/296, 309.9, 322, 434, 499; 428/295; 209/392, 400, 401

[56] References Cited

U.S. PATENT DOCUMENTS

| | | | |
|---|---|---|---|
| 2,895,535 | 7/1959 | Ono | 156/434 X |
| 4,120,785 | 10/1978 | Kanamori et al. | 209/401 |
| 4,247,007 | 1/1981 | Kai | 209/392 |

Primary Examiner—Z. R. Bilinsky

Attorney, Agent, or Firm—James R. Hoatson, Jr.; Barry L. Clark; William H. Page, II

[57] ABSTRACT

Assembly apparatus for a wear resistant plastic mining screen, preferably one made out of wires formed by extruding urethane around a rigid steel core, includes a feed roll having spaced grooves for receiving elongated profile wires which define the working surface of the screen. A support rod positioning member is mounted at a welding station to frictionally receive a screen support rod on its top side and then be flipped over to position the support rod above the profile wires which pass transversely under it. A welding bar having heated fin portions on its upper and lower sides is then passed between and in contact with the support rod and the profile wires to slightly melt them. The welding bar is then quickly removed and the support rod is quickly moved downwardly against the profile wires and held until the integral joints formed at each intersection are solidified. Additional support rods are welded to the profile wires at spaced intervals until the desired screen length has been reached.

9 Claims, 12 Drawing Figures

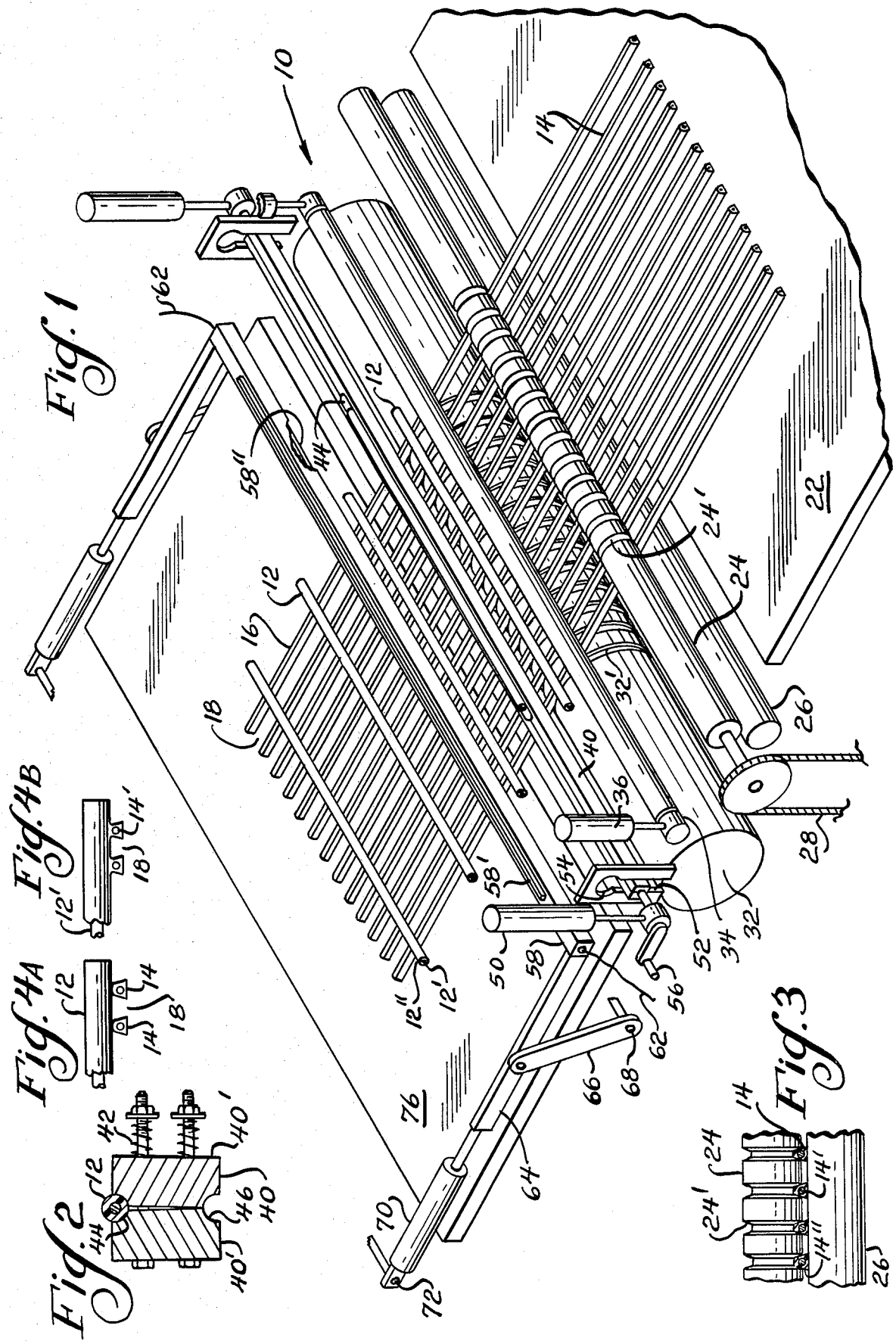

APPARATUS FOR ASSEMBLING A PLASTIC MINING SCREEN

BACKGROUND OF THE INVENTION

The invention relates to the assembly of mining screens and particularly to the assembly of such screens which are provided with a plastic surface for enhancing the abrasion resistance of the screen as compared to stainless steel screens in severely abrasive mining applications such as grading or dewatering. Patents relating to such screens wherein elastomeric material is molded include U.S. Pat. Nos. 3,428,184; 3,483,976; 3,557,276; 3,900,628; 3,980,555; 4,062,796; and 4,100,248. Patent 4,120,785 discloses a screen formed from melt bonded transverse layers of elongated urethane, plastic or elastomeric rope members which have a tensile core. The tensile core portions of the rope members in one layer have a high elongation at break and are preferably formed of twisted strands of fiber or metal while the tensile core portions of the rope members defining the adjacent layer have a low elongation at break.

Some cylindrical plastic well screens are made by wrapping a plastic wire in a helical fashion around a plurality of longitudinal support rods with ultrasonic welds being made at each intersection in a fashion somewhat similar to that used for resistance welding metal well screens as disclosed in E. E. Johnson U.S. Pat. Nos. 2,046,457 and 2,046,458. Such cylindrical screens can then be cut longitudinally and flattened where flat panels are required. A metal screen can be coated with plastic but such a technique is generally used to provide corrosion resistance to the metal since a coating thick enough to provide any substantial degree of abrasion resistance would prevent careful control of slot width and of the shape of the surface profile.

Some plastic screen panels are molded solely of urethane and require a substantial amount of material for backing up the working surface. Other plastic panels are made using ultrasonic welds or solvent welds but such techniques are not satisfactory for use with urethane. It is known, however, that urethane can be thermally welded by heating it sufficiently to cause a partial melting to take place.

SUMMARY

It is among the objects of the present invention to provide an assembly apparatus for relatively rapidly assembling a planar array of spaced, parallel elongated plastic members defining a screen surface to a plurality of transversely arranged, spaced, parallel plastic support rods and integrally bonding the plastic members and the plastic support rods at every intersection. The apparatus of the present invention achieves this object by partially melting the material of each support rod and all the plastic members which it engages while the members are spaced from each other and then quickly moving the support rod into pressure contact with the plastic members and holding it there until the joined members are sufficiently cooled to solidify the melted material. The specific structure utilized in the apparatus is described in general terms in the Abstract and the description need not be repeated here.

BRIEF DESCRIPTION OF THE DRAWINGS

FIG. 1 is a schematic isometric view showing the principal portions of the assembly apparatus;

FIG. 2 is an enlarged sectional view showing the cross-section of the support rod positioning bar;

FIG. 3 is a fragmentary view of the feed rollers as viewed in the axial direction of the profile wire members;

FIGS. 4A and 4B show the relationship of the support and profile members before and after their assembly to each other.

DESCRIPTION OF THE PREFERRED EMBODIMENT

Figure 5:
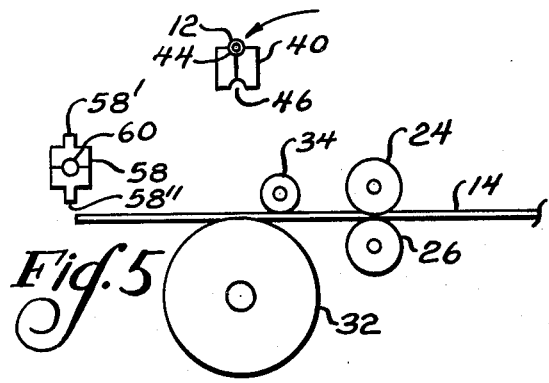
FIGS. 5-11 are schematic side views as viewed in the axial direction of the support rods which illustrate the sequence of operation of the assembly apparatus.

The screen assembly apparatus indicated generally at 10 is utilized to assemble and heat weld a plurality of extruded support rods 12 which have rigid steel cores 12' surrounded by urethane portions 12" to a plurality of extruded surface forming profile members 14 having rigid steel cores 14' surrounded by a urethane layer 14". As successive support rods 12 are welded at spaced intervals to the profile members 14, a screen 16 of indefinite length is produced. Since the screen is usually used in the form of panels, the elongated profile member 14 are typically severed periodically along their length after the screen is formed to produce a plurality of individual screen panels having screen slots or openings 18 defined by the spacing between the profile members 14.

In the initial step of an assembly operation, the desired number of surface profiles 14 are laid out on the feed table 22 with their final working surface, herein shown as flat, resting upside down on the surface of the table. The surface profiles are then threaded through the nip provided between the upper driven feed roll 24 and the lower feed roll 26 so that the upwardly facing portions of the profile members are engaged by the grooves 24' in the upper feed roll. The rolls 24, 26 are slightly separated during this operation. Once the profiles are all positioned in the grooves 24' and the rolls 24, 26 are brought toward each other they may be advanced forwardly through the apparatus by energizing the drive means (not shown) for the drive chain 28 which causes rotation of the feed roll 24. Positioned forwardly of the rolls 24, 26 in the path of movement of the profile members 14 is a profile positioning or support roll 32 which has grooves 32' which are complimentary in shape to the downwardly facing portions of the profile member 14 and have the same spacing as the grooves 24' so as to insure the uniformity of width of the slots 18. The profile members 14 are retained in contact with the profile positioning roll grooves 32' by means of a hold-down roll 34 which may be moved vertically by a pair of hold-down cylinders 36 between an upper threading position and a lower operating position. The hold-down roll 34 engages the profile members 14 slightly upstream of the center line of the roll 32, thus leaving the area adjacent a vertical plane through the center of the positioning roll free for performing the welding operation. The positioning roll 32 forms an anvil which cooperates with a support rod positioning bar 40 during a welding operation to weld the support rods 12 to the profile members 14. The positioning bar 40 is vertically split, at least in the central region wherein it retains support rods, into side portions 40' as shown in FIG. 2. The side portions are normally resiliently biased into contact with each other such as by the spring biased fastening means 42. The top and the bottom of the bar 40 contain, respectively, a first groove 44 and a second groove 46 which preferably have a diameter slightly smaller than the diameter of the support rods 12. Thus, insertion of a support rod 12 into the groove 44 as shown in FIG. 2 will force the side portions 40' slightly away from each other so as to provide a firm frictional engagement between the support rod and the bar 40. The frictional engagement is desired since the positioning bar 40 must be rotated 180° about its longitudinal axis in order to move a support rod 12 from a loading position to an assembly position prior to welding. The support rod positioning bar 40 is moved vertically by a pair of cylinders 50 within vertical guide members 52 carried by the machine frame (not shown). An enlarged aperture 54 at the upper end of the vertical guides 52 permits the support rod positioning bar 40 to be rotated by the crank 56 to bring a support rod 12 which has been inserted by hand into the upper groove 44 from an upwardly facing position to a downwardly facing position whereby it may be brought down into contact with the profile members 14 by action of the cylinders 50. However, after the positioning bar 40 is rotated to cause a support rod 12 to face downwardly, it is maintained vertically spaced above the profile members 14 until the respective members 12, 14 have been heated by a welding or heating bar 58. The welding bar 58 is shown as having integral fin-like portions 58', 58" projecting from its upper and lower surfaces and an internal rod type heater element 60 heated by current passing through wires 62. The welding bar 58 is supported by support arms 64 which are in turn carried by pivoted links 66 which are pivotally mounted to the machine frame at 68. The support arms 64 and the welding bar 58 carried thereby are moved generally horizontally into and out of the welding position by a pair of cylinders 70 which are pivoted to the machine frame at 72. Actuation of the cylinders 70 when the positioning bar 40 is spaced at the top of its range above the profile positioning roll 32 will cause the welding bar 58 to move into welding position with the lower fin portion 58" in contact with the profile members 14. The cylinders 50 are then immediately actuated to bring the support rod 12 down into contact with the upper fin portion 58'. After the downwardly facing support rod 12 which is in the bar 40 at the welding station, and the portions of each profile member 14 which is under it, are slightly melted, the cylinders 50 are operated to lift the positioning bar 40 for a short period of time sufficient to permit the withdrawal of the welding bar 58 by the cylinders 70. The positioning bar 40 is then immediately moved downwardly and maintained for a sufficient time to cause the slightly melted portion of the support rod 12 and the profile members 14 to fuse to each other and slightly cool. The positioning bar is then lifted upwardly to disengage the just welded support rod which is permitted to cool for a period of about 10-15 seconds. During this period, an additional support rod 12 can be placed in the now upwardly facing groove 46 in bar 40 in preparation for another cycle of operation.

FIGS. 4A and 4B illustrate how the profile members 14 and the support rods 12 fuse to each other during the welding operation. Preferably, the amount of penetration of the members into each other is sufficient to provide a firm attachment of the members to each other but insufficient to permit the steel core portions 12' and 14' to contact each other. By maintaining a thickness of resilient urethane between the respective steel core portions, the resulting screen will maintain a degree of resiliency which will enhance its performance. In one use of the apparatus, satisfactory results were seen when the support rods 12 had an outer diameter of 0.250" and a steel core diameter of 0.128"; the profile members had a height of 0.120" and a steel core diameter of 0.062"; the heater fins 58', 58" were heated to about 450° F. and contacted with the members 12, 14 for about 10 seconds; and the members 12, 14 were forced together for about 10 seconds after the heater bar was removed. The resulting screen had an overall height of about 0.340" or about a 0.030" penetration during welding.

Figure 6:
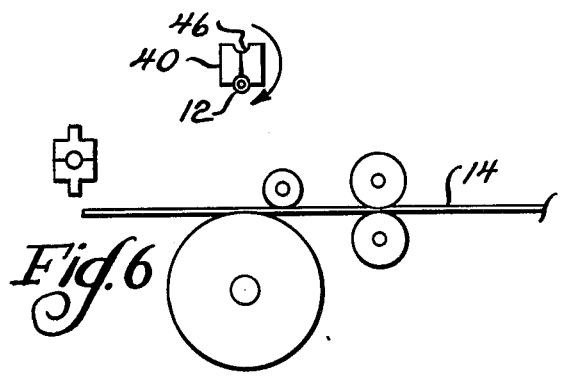
Figure 7:
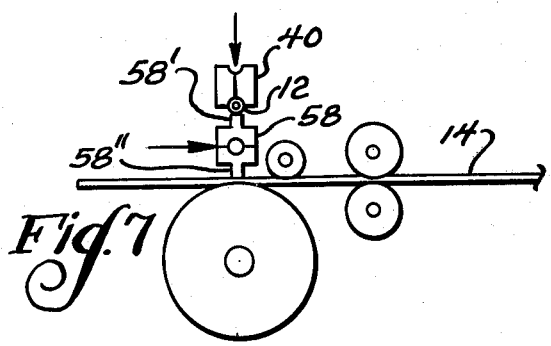
Figure 8:
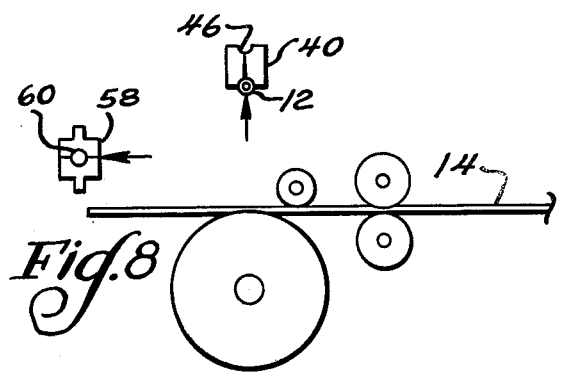
Figure 9:
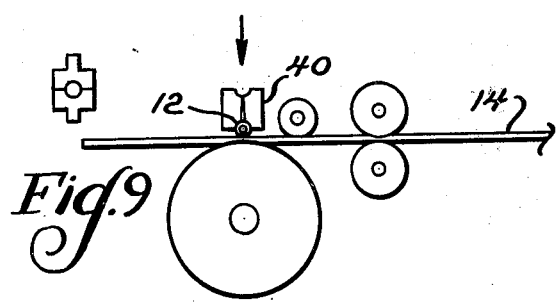
Figure 10:
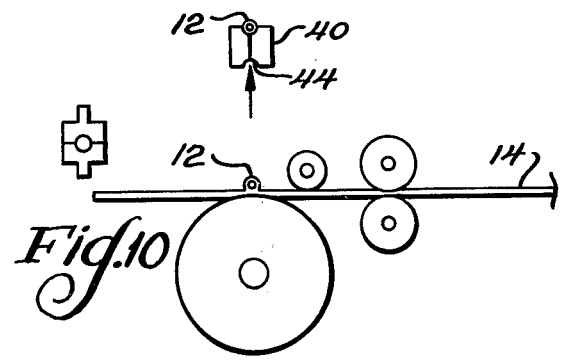
Figure 11:
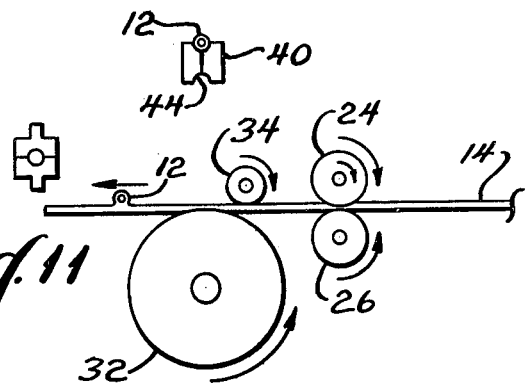

FIGS. 5–11 illustrate the sequence of operation of the apparatus. In FIG. 5, the profile members 14 are shown as having been advanced beyond the welding station which is in the vertical plane passing through the profile positioning roll 32. The support rod 12 is frictionally engaged in the groove 44 in the support rod positioning bar 40 so that it can be turned 180° with the bar 40 as shown in FIG. 6. FIG. 7 shows the welding or heating bar 58 after its lower fin 58" has been brought into contact with the profiles 14 and the support rod 12 has been moved downwardly against the upper heated fin 58'. After the members 12, 14 are heated sufficiently to soften or slightly melt the portions contacted by the heated fins 58', 58", the bar 40 is slightly raised and the heater bar 58 is withdrawn as shown in FIG. 8. The bar 40 is then immediately moved downwardly to weld the members 12, 14 to each other and held until the members are sufficiently cool to remain attached when the bar 40 is raised. The bar 40 is then raised to its upper position shown in FIG. 10 and the just welded members are allowed to further cool before the feed roll 24 is rotated as shown in FIG. 11 to drive the profile members 14 and the idler rolls 26, 32, 34 so as to move the welded support rod 12 a predetermined distance to the left in preparation for another cycle of operation. During the further cooling period, a succeeding support rod 12 can be inserted in the upwardly facing groove.

Although the bar 40 has been shown to be rotatable, it would, of course, be possible for it to be non-rotatable with a groove only in its bottom, at the loss of some convenience in loading of the support bars 12. The profile members 14 have been shown as having tapered sides and a flat working surface but other shapes could be used as desired. To prevent sticking of the heater fins 58', 58" to the plastic members 12, 14, the fins are preferably covered with a layer of a non-stick material, such as a fluorocarbon.

We claim as our invention:

1. An assembly apparatus for assembling and thermally welding an elongated support rod having at least a thermoplastic coating simultaneously to a plurality of spaced, profiled screen surface members having at least a thermoplastic coating and which are arranged in a plane so as to be parallel to each other and transverse to said support rod; said apparatus having a pair of cooperating feed rollers, at least one of which is driven, for engaging and feeding said profiled members to a welding station wherein they are supported by a support roller; at least one of said feed rollers being grooved to accept said profiled members and to establish their spacing relative to each other; an elongated support rod positioning bar having at least one surface which includes a groove for receiving a support rod and retaining it, said support rod positioning bar being located above the welding station and said at least one surface comprising its bottom surface during a welding operation; an elongated welding bar mounted for movement into and out of a position in a vertical plane in the welding zone area between said support rod positioning bar and said profiled members, said welding bar containing heater means and having upper and lower heated portions for simultaneously heating the bottom side of said support rod carried by said support rod positioning bar and a top portion of each of said profiled members; and means for forcing said support rod positioning bar and the support rod positioned thereunder downwardly as the welding bar is removed from said welding zone area, said downward movement causing the intersecting portions of said support rod and profiled members which are at least partially melted or softened by the welding bar to flow together into an intimate fused relationship.

2. The assembly apparatus of claim 1 wherein the support rods and profiled members have a rigid steel core and said downward movement is sufficient to partially embed the thermoplastic surface of the support rods into the thermoplastic surface of the profiled members but insufficient to permit the steel cores in the respective members to contact each other.

3. The assembly apparatus of claim 1 wherein said elongated support rod positioning bar also has a groove on a surface which is opposite to said at least one surface and is mounted so that it can be rotated 180° to permit a support rod to be loaded in an upwardly facing groove and then moved into a downwardly facing direction.

4. The assembly apparatus of claim 1 wherein said support roller is grooved at spaced intervals along its length for engaging said profile members and determining the slot opening width between them.

5. The assembly apparatus of claim 4 wherein said welding bar is mounted on a pair of support arms which are moved generally horizontally into and out of said vertical plane by means of fluid cylinders.

6. The assembly apparatus of claim 5 wherein each of said support arms is partially supported by a pivot link which provides a slight lifting or lowering of said welding bar as it starts to leave or enter the welding zone area.

7. The assembly apparatus of claim 3 wherein vertical guide means are provided for permitting upward and downward movement of said support rod positioning bar.

8. The assembly apparatus of claim 7 wherein said vertical guide means includes an enlarged opening at the top thereof for permitting rotation of said support rod positioning bar.

9. The assembly apparatus of claim 1 wherein the support rod positioning bar has separable side portions which are resiliently biased toward each other so as to cause said groove in said at least one surface to normally have a dimension less than that of a support rod placed therein so as to frictionally engage said rod.

* * * * *